US006788438B2

United States Patent
Takahashi et al.

(10) Patent No.: US 6,788,438 B2
(45) Date of Patent: Sep. 7, 2004

(54) IMAGE READING DEVICE AND IMAGE FORMING APPARATUS COMPRISING THE SAME

(75) Inventors: Masayoshi Takahashi, Osaka (JP); Shinobu Satonaka, Osaka (JP); Kensuke Fujihara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 653 days.

(21) Appl. No.: 09/819,684

(22) Filed: Mar. 29, 2001

(65) Prior Publication Data

US 2001/0035985 A1 Nov. 1, 2001

(30) Foreign Application Priority Data

Apr. 27, 2000 (JP) ........................................ 2000-127010
Oct. 20, 2000 (JP) ........................................ 2000-321819

(51) Int. Cl.[7] .............................. H04N 1/40; H04N 1/04; H04N 3/14; H01L 27/00
(52) U.S. Cl. ...................... 358/483; 358/462; 358/482; 358/486; 348/297; 348/298; 250/208.1
(58) Field of Search ................................. 358/483, 482, 358/486, 462; 348/297, 298; 250/208.1

(56) References Cited

U.S. PATENT DOCUMENTS 4,587,415 A * 5/1986 Tsunekawa et al. ......... 250/204
4,628,368 A * 12/1986 Kurata et al. ............... 358/497
4,878,119 A * 10/1989 Beikirch et al. ............ 358/471

FOREIGN PATENT DOCUMENTS

| JP | 51-134512 | 11/1976 |
| JP | 59-105766 | 6/1984 |
| JP | 04-188942 | 7/1992 |
| JP | 10-327304 | 12/1998 |
| JP | 11-234481 | 8/1999 |
| JP | 2000-69254 | 3/2000 |

* cited by examiner

Primary Examiner—Edward Coles
Assistant Examiner—Houshang Safaipour
(74) Attorney, Agent, or Firm—Smith, Gambrell & Russell, LLP (57) ABSTRACT

An image reading device including an image sensor for optically reading a document and outputting an electric signal, a period control circuit for controlling the period of a horizontal synchronizing signal in order to change a time period during which charge is stored in the image sensor, and a scanning speed control circuit for controlling the scanning speed of the document to be a speed conforming to the period of the horizontal synchronizing signal. The horizontal synchronizing signal and the scanning speed are variably set to values corresponding to an image reading mode, for example.

18 Claims, 6 Drawing Sheets

IMAGE READING DEVICE AND IMAGE FORMING APPARATUS COMPRISING THE SAME

BACKGROUND OF THE INVENTION

1. Field of the Invention

The present invention relates to an image reading device used in equipment such as a scanner, a copying machine, or a facsimile, and an image forming apparatus comprising the image reading device.

2. Description of Related Art

Image forming apparatuses such as copying machines or facsimiles comprise an image reading device for reading a document image and an image recording device for recording on a paper sheet an image corresponding to the image read by the image reading device. The speed at which the image is read by the image reading device and the speed at which the image is recorded by the image recording device are generally set to approximately equal values. An image reading operation and an image recording operation are synchronously performed.

The image reading device comprises an image sensor represented by a CCD (Charge Coupled Device). The image sensor detects, when a light source is moved relative to an image surface of a document, light reflected from the image surface as incident light while illuminating the image surface by the light source. The image sensor converts the incident light into charge and stores the charge, and converts the stored charge into an electric signal and outputs the electric signal.

The electric signal is inputted to a laser scan unit in a copying machine, for example, as an image signal. The laser scan unit subjects laser beams to ON/OFF control depending on the image signal, and exposes a surface of a photoreceptor by the laser beams. The surface of the photoreceptor before the exposure is uniformly charged, so that an electrostatic latent image is formed on the surface of the photoreceptor upon exposure by the laser beams. The electrostatic latent image is thereafter developed into a toner image by a developing device, and the toner image is transferred onto the paper sheet.

Generally, the smaller the amount of light incident on the image sensor is, the smaller the amount of charge stored in the image sensor is, while the larger the amount of the incident light is, the larger the amount of the stored charge is. If the amount of incident light is insufficient, the amplitude of the image signal is decreased, so that the SN (Signal-to-Noise) ratio thereof is lowered. As a result, the image quality of the toner image is degraded. On the other hand, if the amount of the incident light is too large, an overflow of charge called blooming occurs, thereby making it impossible to perform normal image reading.

A light source for illuminating the document is degraded with an elapse of a time period during which it is used (a time period during which it is turned on) so that the amount of emitted light is decreased. Correspondingly, the S/N ratio of the image signal is reduced. A light amount adjusting function has been conventionally provided to the light source to adjust the amount of light emitted from the light source, thereby adjusting the amount of light incident on the image sensor in a suitable range.

In order to provide the light amount adjusting function to the light source, however, a light amount adjusting circuit or the like must be provided. Accordingly, the cost of the image forming apparatus is increased.

On the other hand, even when a light source having a light amount adjusting function is used, the amount of light incident on the image sensor cannot be always suitably adjusted. That is, there is a case where even if the amount of light from the light source is adjusted to a maximum, an amount of incident light required for the image sensor cannot, in some cases, be ensured. If a light amount adjusting range is narrow, it may be impossible to ensure a suitable amount of light incident on the image sensor.

An example of the image reading device provided in the image forming apparatus is one capable of setting a monochrome mode in which a document image is read in a single color and a full color mode in which a document image is read in a full color. Further, the image reading device in the image forming apparatus may, in some cases, be used as an image scanner for accepting an image in a personal computer or the like.

Since the image sensor capable of reading an image in a full color comprises a color filter, sensitivity to the amount of incident light tends to be low due to the effect. If a light source outputting a large amount of light, for example, a halogen lamp is used, the problem will be solved. However, such a high-power light source is expensive and consumes a large amount of power. Further, a rare gas lamp which has been frequently used in recent years as a light source for document illumination cannot obtain a sufficient amount of light. So long as the rare gas lamp is used, a sufficient S/N ratio at the time of reading a high-quality image in the full color mode is difficult to ensure.

SUMMARY OF THE INVENTION

A first object of the present invention is to provide an image reading device capable of improving the image quality of a read image without requiring to adjust the amount of light from a light source.

A second object of the present invention is to provide an image reading device capable of reading an image with its quality enhanced depending on an image reading mode.

A third object of the present invention is to provide an image forming apparatus capable of reading a document image with its quality enhanced without requiring to adjust the amount of light from a light source and forming an image corresponding to the read image on a paper sheet.

A fourth object of the present invention is to provide an image forming apparatus capable of reading a document image with its quality enhanced depending on an image reading mode and forming an image corresponding to the read image on a paper sheet.

An image reading device according to the present invention comprises an image sensor for scanning a surface of a document, optically reading an image formed on the surface of the document, and outputting an electric signal corresponding to the read image; a period control circuit for controlling the period of a horizontal synchronizing signal to be fed to the image sensor in order to change a time period during which charge is stored in the image sensor; and a scanning speed control circuit for controlling the scanning speed for the surface of the document by the image sensor to be a speed conforming to the period of the horizontal synchronizing signal.

The image reading device according to an embodiment of the present invention further comprises an image reading mode setting section for setting an image reading mode. In this case, it is preferable that the period control circuit variably sets the period of the horizontal synchronizing signal depending on the image reading mode set by the image reading mode setting section. Similarly, it is preferable that the scanning speed control circuit variably sets the scanning speed depending on the image reading mode set by the image reading mode setting section.

The scanning of the surface of the document by the image sensor may be attained by causing the document to stand still on a transparent platen, for example, while moving a light source for illuminating the document relative to the document as well as causing light reflected from the document to be incident on the image sensor. Further, the scanning of the surface of the document may be attained by causing the light source for illuminating the document to stand still, while conveying the document such that the document passes through a position illuminated by the light source and causing the light reflected from the document to be incident on the image sensor in the course of conveying the document. Consequently, the adjustment of the scanning speed for the surface of the document by the image sensor is attained by adjusting the speed of a motor for moving the light source or a motor for conveying the document (hereinafter generically referred to as a scan motor), for example.

It is preferable that the image reading mode which can be set by the image reading mode setting section includes a monochrome mode and a full color mode. Further, the image reading mode which can be set by the image reading mode setting section includes a monochrome mode, a full color mode, and an image scanner mode. In such a case, it is preferable to set the period of the horizontal synchronizing signal to a relatively short period when the image reading mode is the monochrome mode, while setting the period of the horizontal synchronizing signal to a relatively long period when the image reading mode is the full color mode or the image scanner mode. Consequently, at the time of the full color mode or the image scanner mode, a time period during which charge is stored in the image sensor is lengthened. Accordingly, a high S/N ratio is ensured, thereby making it possible to read an image with its quality enhanced. On the other hand, at the time of the monochrome mode, a time period during which charge is stored in the image sensor is shortened, thereby making it possible to read an image at high speed.

In conformity with such setting of the horizontal synchronizing signal, it is preferable that the scanning speed control circuit sets the scanning speed to a relatively high speed when the image reading mode is the monochrome mode, while setting the scanning speed to a relatively low speed when the image reading mode is the full color mode or the image scanner mode.

More specifically, the period of the horizontal synchronizing signal at the time of the monochrome mode, for example, may be set to an approximately integral fraction of 1 (for example, one-half) the period of the horizontal synchronizing signal at the time of the full color mode or the image scanner mode. Correspondingly, the scanning speed at the time of the monochrome mode may be set to an approximately integral multiple of (for example, twice) the scanning speed at the time of the full color mode or the image scanner mode. Such setting of the period of the horizontal synchronizing signal or the scanning speed can be attained by choosing whether or not an output of a reference signal generation circuit for generating a reference signal is frequency-divided. Accordingly, it is possible to adjust the period of the horizontal synchronizing signal and adjust the scanning speed in simple construction.

An image reading device according to another embodiment of the present invention further comprises a light amount sensor for detecting the amount of light from a light source for illuminating the surface of the document, and a light amount comparison circuit for comparing the amount of light detected by the light amount sensor with the reference amount of light. In this case, it is preferable that the period control circuit variably sets the period of the horizontal synchronizing signal on the basis of the results of the comparison by the light amount comparison circuit. Consequently, a time period during which charge is stored in the image sensor is variably set depending on the amount of light from the light source. Accordingly, an image can be read with its quality enhanced without being affected by the variation in the amount of light from the light source and the change with time of the amount of light from the light source. It is preferable that the scanning speed of the document is variably set depending on the results of the comparison by the light amount comparison circuit in response to the variable setting of the horizontal synchronizing signal.

Furthermore, the results of the comparison by the light amount comparison circuit may be displayed on the display device, and a maintenance worker may variably set the period of the horizontal synchronizing signal and the scanning speed manually depending on the results of the comparison.

The light amount sensor may be used as the image sensor. The light amount sensor may be provided separately from the image sensor.

An image forming apparatus according to the present invention comprises the above-mentioned image reading device, and a print section for forming on a paper sheet an image corresponding to the image read by the image reading device. Such construction makes it possible to read a document image with its quality enhanced and correspondingly to form the image of high quality on the paper sheet.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
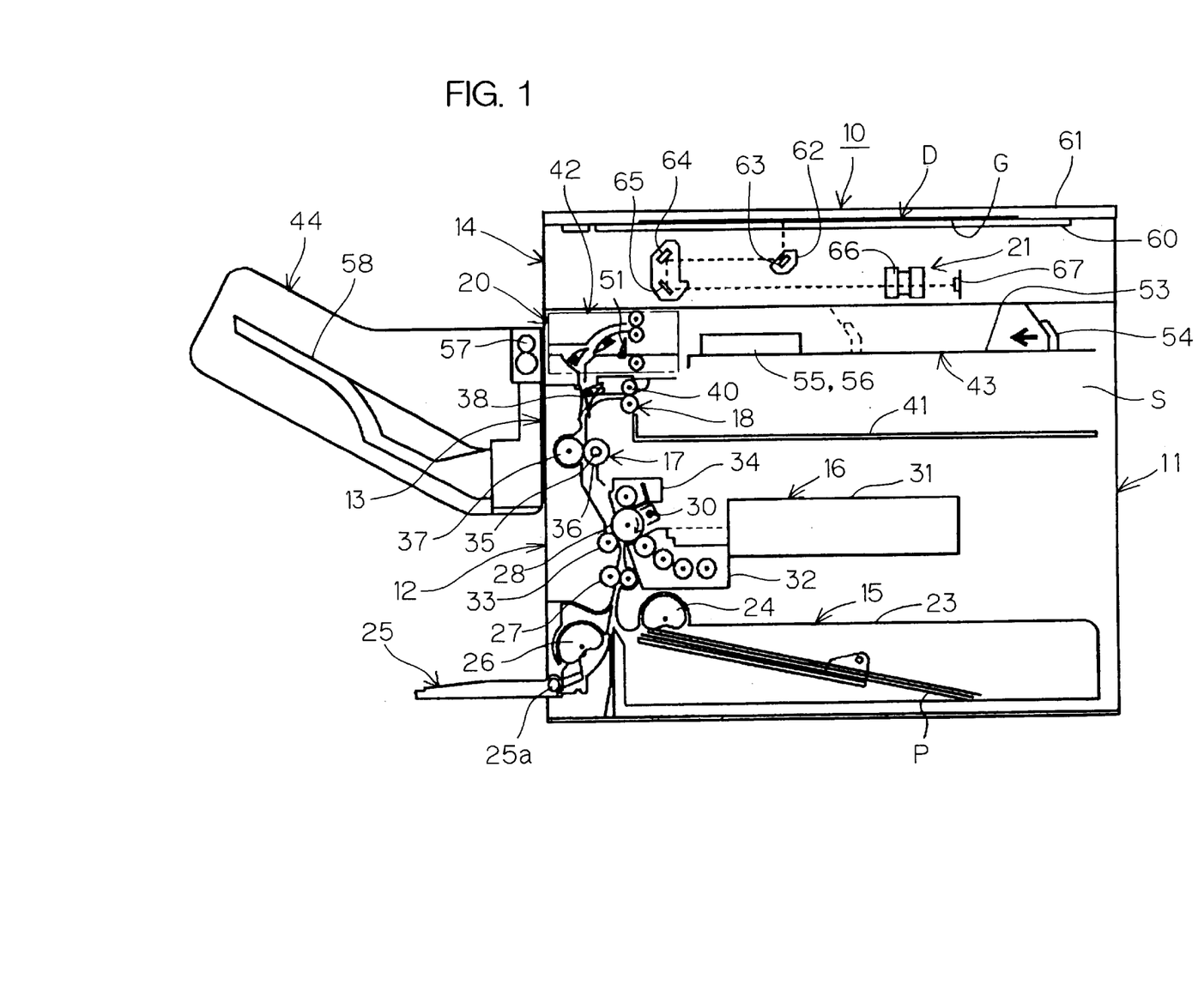
FIG. 1 is a schematic sectional view showing the internal construction of a copying machine serving as an image forming apparatus according to an embodiment of the present invention as viewed from the front.
Figure 2:
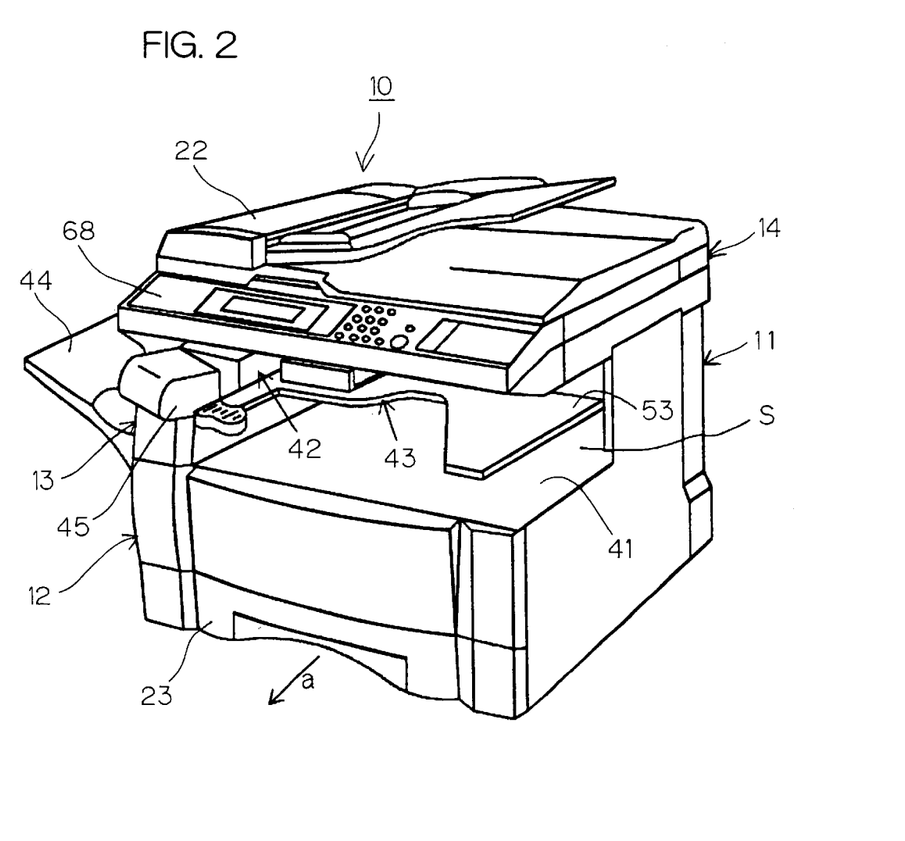
FIG. 2 is a perspective view showing the external shape of the copying machine shown in FIG. 1.

FIG. 1 is a schematic sectional view showing the internal construction of a copying machine 10 serving as an image forming apparatus according to an embodiment of the present invention as viewed from the front. FIG. 2 is a perspective view showing the external shape of the copying machine 10. The copying machine 10 comprises a main body of a copying machine (hereinafter referred to as a copying machine main body) 11 formed in an approximately rectangular parallelepiped shape. The copying machine main body 11 is divided into three parts in the vertical direction, and comprises a lower housing 12, a connecting housing 13, and an upper housing 14 in this order from the bottom.

A paper feeding section 15 is provided at the bottom of the lower housing, an image forming section 16 is arranged above the paper feeding section 15, and a fixing section 17 is further provided above the image forming section 16.

Furthermore, the connecting housing 13 is provided with a paper discharge section 18 and a post-processing section 20. Recording sheets (for example, paper sheets) P on which an image is to be formed are delivered from the paper feeding section 15, and are conveyed upward in the lower housing 12, to lead to the post-processing section 20.

The upper housing 14 contains an image reading section 21. The connecting housing 13 forms a paper discharge space S between the lower housing 12 and the upper housing 14 on the right side in FIG. 1 of the paper discharge section 18.

The paper feeding section 15 comprises a paper feeding cassette 23 containing a plurality of paper sheets P in a stacked state, a paper feeding roller 24 for feeding the paper sheets P in the paper feeding cassette 23 one at a time, a manual paper feeding tray 25 for a user manually feeding the paper sheets P, a paper feeding roller 26 for feeding the paper sheets P set in the manual paper feeding tray 25, and a registration roller 27 for stopping the paper sheets P fed from the paper feeding rollers 24 and 26 once and feeding the paper sheets P again at timing which is synchronized with an image forming operation in the image forming section 16.

The paper feeding cassette 23 is so constructed that it can be pulled out forward (in a direction indicated by an arrow a in FIG. 2), that is, toward the user. It is possible to supply the paper sheets P and replace the paper sheets P with paper sheets P of a different size with the paper feeding cassette 23 pulled out.

The manual paper feeding tray 25 is supported so as to be swingable on the lower housing 12 by a shaft 25a at its base end. The manual paper feeding tray 25 swings around the shaft 25a, thereby making it possible to assume an approximately horizontal operating position shown in FIG. 1 and an approximately upright retreat position along a side surface (a left side surface in FIG. 1) of the copying machine main body 11.

The image forming section 16 comprises a photoreceptor 28 in a rectangular parallelepiped shape serving as an image carrying member, a main charger 30 for uniformly charging a surface of the photoreceptor 28, an exposure unit (for example, a laser scan unit) 31 for exposing the surface of the photoreceptor 28 after the charging to form an electrostatic latent image, a developer 32 for developing the electrostatic latent image into a toner image, a transfer charger (a transfer roller) 33 for transferring the toner image on the photoreceptor 28 on a surface of the paper sheet P, and a cleaner 34 for removing toner particles remaining on the surface of the photoreceptor 28 after the toner image is transferred. The exposure unit 31 comprises a laser light source which is subjected to ON/OFF control on the basis of image information read by the image reading section 21, and scans the surface of the photoreceptor 28 by laser beams modulated depending on the image information, to write the electrostatic latent image on the surface of the photoreceptor 28.

The paper discharge section 18 comprises a flapper 38 for switching a conveying path of the paper sheet P on which the toner image has been fixed to the upper post-processing section 20 and the paper discharge space S, a paper discharge roller 40 for discharging the paper sheet P from the flapper 38 toward the paper discharge space S, and a flat plate-shaped paper discharge plate 41 for defining the bottom of the paper discharge space S. The paper sheet P discharged from the paper discharge roller 40 is stacked on the paper discharge plate 41 in a so-called face-down posture in which its image surface (a surface on which the toner image has been fixed) is directed downward.

The post-processing section 20 comprises a feeding and conveying unit 42, an alignment unit 43, a paper discharge tray 24, and a stapler 45 serving as a post-processor (see FIG. 2).

The feeding and conveying unit 42 is disposed above the paper discharge section 18. As illustrated in enlarged fashion in FIGS. 3 and 4, the feeding and conveying unit 42 comprises a first flapper 46 and a second flapper 47, which can be switched, for guiding the paper sheet P conveyed from the paper discharge section 18, upper and lower paper discharge rollers 48 and 50 for discharging the paper sheet P guided by the first and second flappers 46 and 47 toward the alignment unit 43, a stopper 51, which can retreat, for defining a rear end of the paper sheet P discharged to the alignment unit 43, and a conveying roller 52 for conveying the paper sheet P on the alignment unit 43 toward a paper discharge tray 44.

Figure 3:
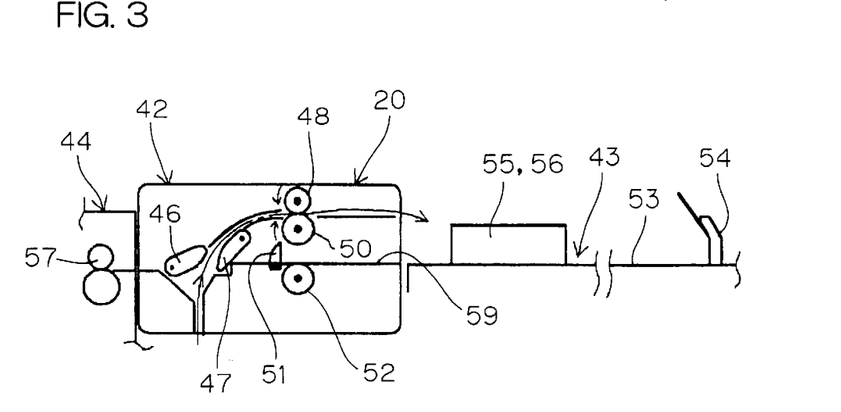
FIG. 3 is a diagram showing how a paper sheet on which toner particles have been fixed is discharged into an intermediate tray.
Figure 4:
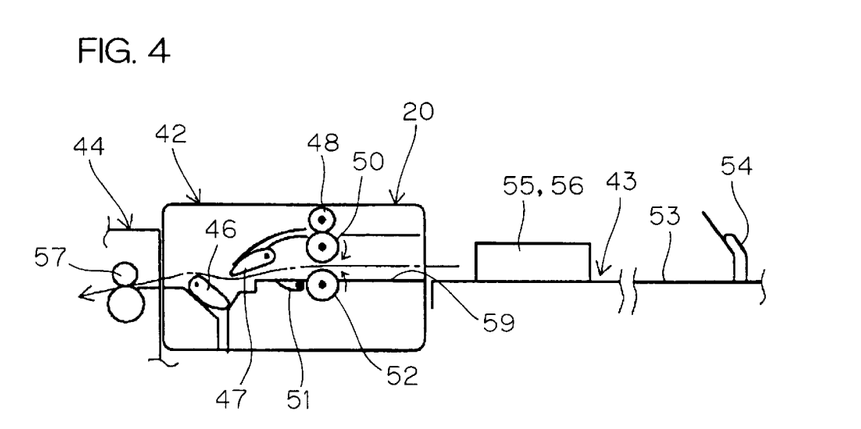
FIG. 4 is a diagram showing how paper sheets which have been stapled are discharged.

The first and second flappers 46 and 47 can be switched to respective positions shown in FIGS. 3 and 4. When the first and second flappers 46 and 47 respectively assume the positions shown in FIG. 3, the paper sheet P from the paper discharge section 18 is introduced into the paper discharge rollers 48 and 50. Contrary to this, when the first and second flappers 46 and 47 respectively assume the positions shown in FIG. 4, the paper sheet P is conveyed to the paper discharge tray 44 from the alignment unit 43 with the paper sheet P held between the lower discharge roller 50 and the conveying roller 52.

The stopper 51 assumes an upright position (see FIG. 3) projecting upward from a reference surface 59 and a retreat position (see FIG. 4) retreating downward from the reference surface 59. Further, the conveying roller 52 can assume a retreat position (see FIG. 3) retreating downward from the reference surface 59 and an operating position (see FIG. 4) projecting upward from the reference surface 59. When the conveying roller 52 is in the retreat position, a clearance into which rear ends of the plurality of paper sheets P can enter is formed between the conveying roller 52 and the lower paper discharge roller 50.

The lower paper discharge roller 50 is also used as a paper discharge roller and a conveying roller. That is, the lower paper discharge roller 50 discharges the paper sheet P onto an intermediate tray 53 in cooperation with the upper discharge roller 48 in the state shown in FIG. 3. On the other hand, in the state shown in FIG. 4, the lower discharge roller 50 holds the paper sheet P, to convey the paper sheet P leftward in FIG. 3 or 4 in cooperation with the conveying roller 52.

The feeding and conveying unit 42 can thus discharge the paper sheet P, which has been conveyed from the lower paper discharge section 18, to the alignment unit 43 on the right side thereof and discharge the paper sheet P, which has been discharged onto the alignment unit 43, onto the discharge tray 44 on the left side thereof.

The alignment unit 43 is disposed adjacent to the feeding and conveying unit 42, as shown in FIG. 1. That is, the alignment unit 43 is positioned above the paper discharge plate 41, that is, in an upper part of the discharge space S. As shown in FIG. 3, the alignment unit 43 comprises the intermediate tray 53 for supporting the paper sheet P discharged from the feeding and conveying unit 42 from below, a forward drawing member 54 which is movable almost rightward and leftward along an upper surface of the intermediate tray 53 (a surface on which paper sheets are stacked), and width drawing members 55 and 56 which are movable almost backward and forward along the upper surface of the intermediate tray 53.

The forward drawing member 54 repeats reciprocating motion in a right-and-left direction every time the paper sheet P is discharged onto the intermediate tray 53. Consequently, the forward drawing member 54 presses a front end of the paper sheet P to abut a rear end of the paper sheet P against the stopper 51 at the time of leftward movement. Therefore, the positions in the direction of conveyance of the paper sheets P on the intermediate tray 53 are matched. On the other hand, the width drawing members 55 and 56 mutually repeat approach/separation every time the paper sheet P is discharged onto the intermediate tray 53. That is, the width drawing members 55 and 56 press an edge of the paper sheet P at the time of approach. Therefore, positions in a direction perpendicular to the direction of conveyance of the paper sheets P on the intermediate tray 53 (hereinafter referred to as the "width direction") are aligned.

The width drawing members 55 and 56 are used by moving the paper sheet P on the intermediate tray 53 toward a front surface of the copying machine main body 11 (toward the user) to shift the position in the width direction of the paper sheet P discharged onto the paper discharge tray 44 in addition to the above-mentioned matching operation in the width direction, to classify copies. Further, the width drawing members 55 and 56 also have the function of moving the paper sheet P on the intermediate tray 53 to a position corresponding to the stapler 45 on the front surface of the copying machine main body 11 and moving the plurality of paper sheets P which have been stapled backward to return the paper sheets P to their original position.

The paper discharge tray 44 is arranged on the left side of the feeding and conveying unit 42, and comprises a discharge roller 57 for discharging the paper sheet P conveyed from the feeding and conveying unit 42 leftward, and a stacking section 58 for supporting the discharged paper sheet P from below.

The stapler 45 staples the plurality of paper sheets P, and is disposed short of the feeding and conveying unit 42, as shown in FIG. 2.

The image reading section (the image reading device) 21 comprises a document platen having light transmission properties (a transparent platen) 60 on which a document D is disposed with its image surface (image information) G directed downward, a document pressing plate 61, which can be freely opened or closed, for pressing the document D against the document platen 60, a scanning unit 62 moving rightward from the left while irradiating the image surface G of the document D on the document platen 60 with light, mirrors 63, 64, and 65 for further reflecting light reflected from the image surface G, a lens unit 66 for forming an image on a CCD 67 serving as an image sensor, and the CCD 67.

The document reading section 21 performs so-called fixed reading for fixing the document D and moving the scanning unit 62. The image information read by the image reading section 21 is fed to the exposure unit 31. An operation panel 68 which is operated by the user is disposed on the side of the front surface of the upper housing 14 having the image reading unit 21 disposed in its inner part.

The document D arranged on the document platen 60 is scanned by the scanning unit 62, for example, and light reflected from the document D is incident on the CCD 67 in the step of the scanning, so that the image surface (image information) G is read. That is, an image on the image surface G is converted into an image signal which is an electric signal. The image signal is fed to the exposure unit 31 in the image forming section 16 after being subjected to image data processing.

In the image forming section 16, the photoreceptor 28 is rotated in the direction indicated by an arrow in FIG. 1 simultaneously with such an image reading operation, and its surface is uniformly charged to a predetermined polarity and a predetermined potential by the main charger 30. The surface of the photoreceptor 28 after the charging is subjected to exposure based on an image signal by the exposure unit 31. Consequently, an electrostatic latent image is formed. The electrostatic latent image is developed into a toner image by the developer 32. The toner image formed on the photoreceptor 28 is thus transferred to the surface of the paper sheet P by the transfer charger 33.

The paper sheet P is subjected to primary paper feeding by the paper feeding roller 24 or the paper feeding roller 26 from the cassette 23 in the paper feeding section 15 or the manual paper feeding tray 25. Thereafter, the paper sheet P is stopped once by the registration roller 27. Further, the paper sheet P is subjected to secondary paper feeding to a transfer area between the photoreceptor 28 and the transfer charger 33 so as to be synchronized with the toner image on the photoreceptor 28.

The toner particles remaining on the surface of the photoreceptor 28 after the toner image is transferred are removed by the cleaner 34, to prepare for the subsequent image forming cycle.

The paper sheet P on which the toner image has been transferred is conveyed to the fixing section 17, and is heated and pressed by the functions of a fixing roller 36 and a pressure roller 37, so that the toner image is fixed to the surface of the paper sheet P.

The paper sheets P on which the toner image has been fixed are conveyed to different destinations of discharge depending on whether or not post-processing is required.

When the post-processing is not required, the paper sheet P on which the toner image has been fixed is introduced by the flapper 38 in the paper discharge section 18 into the paper discharge roller 40 on the right side of the flapper 28. The paper sheet P is discharged by the paper discharge roller 40 onto the paper discharge plate 41 on the right side thereof in a so-called face-down posture in which the image surface (the surface on which the toner image has been formed) directed downward. The discharged paper sheets P are successively stacked.

On the other hand, when the post-processing is required, the paper sheet P on which the toner image has been fixed is conveyed to the feeding and conveying unit 20 above the flapper 38 by switching the flapper 38. The paper sheet P is introduced into the upper and lower paper discharge rollers 48 and 50 by the first and second flappers 46 and 47 which are positioned as shown in FIG. 3, and is discharged onto the intermediate tray 53. At this time, the conveying roller 52 is in its retreat position, and the stopper 51 is in its upright position.

The paper sheet P which has been discharged onto the intermediate tray 53 has its front end pressed leftward by the forward drawing member 54 and has its rear end abutted against the stopper 51. Consequently, the positions in the direction of conveyance of the paper sheets P are aligned. At the same time, right and left side ends of the discharged paper sheet P are pressed by the width drawing members 55 and 56. Consequently, the positions of the paper sheets in the width direction are aligned. Such an alignment operation is similarly performed with respect to the paper sheets P successively discharged onto the intermediate tray 53.

When a predetermined number of paper sheets P to be stapled are stacked on the intermediate tray 53, the discharge of the paper sheet P is stopped. Thereafter, the width drawing members 55 and 56 in a state where they are abutted against the side end in the width direction of the paper sheet P are moved toward the front of the copying machine main body 11, to arrange the front at the rear end of the paper sheet P in a position for processing by the stapler 45. Thereafter, the stapler 45 is operated, so that a predetermined number of paper sheets P are stapled. The paper sheets P which have been stapled are moved backward by the width drawing members 55 and 56, and are returned to their original position. The rear end of the returned paper sheet P is held between the lower paper discharge roller 50 and the conveying roller 52 by the function of the conveying roller 52 arranged in the operating position, as shown in FIG. 4. Further, the stopper 51 is arranged in the retreat position shown in FIG. 4, and the first and second flappers 46 and 47 are arranged in respective positions shown in FIG. 4. Furthermore, the lower paper discharge roller 50 and the conveying roller 52 are respectively rotated in directions indicated by arrows. Consequently, the paper sheets P which have been stapled are discharged leftward in FIG. 4, are discharged onto the stacking section 58 (see FIG. 1) by the paper discharge roller 57 in the paper discharge tray 44, and are stacked on the stacking section 58.

Figure 5:
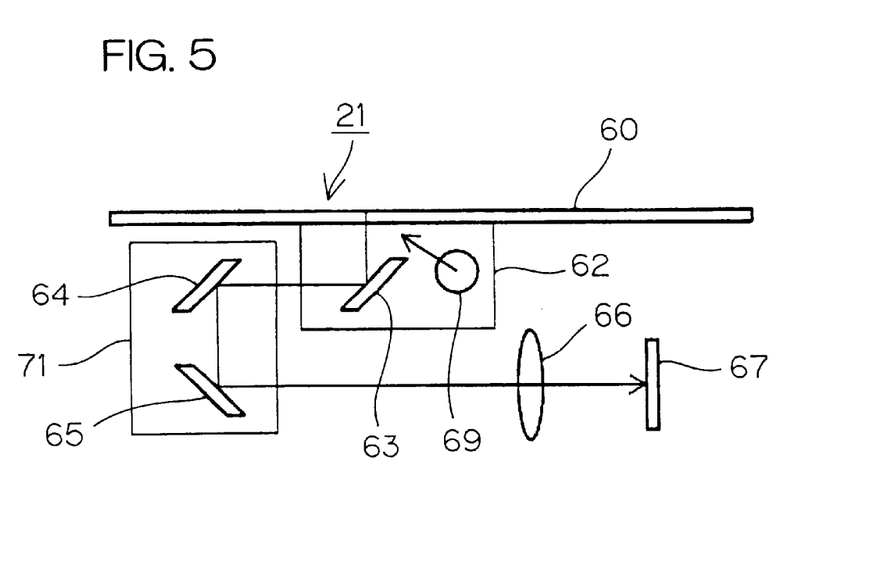
FIG. 5 is an illustration showing the construction of an image reading device provided in the copying machine.
Figure 6:
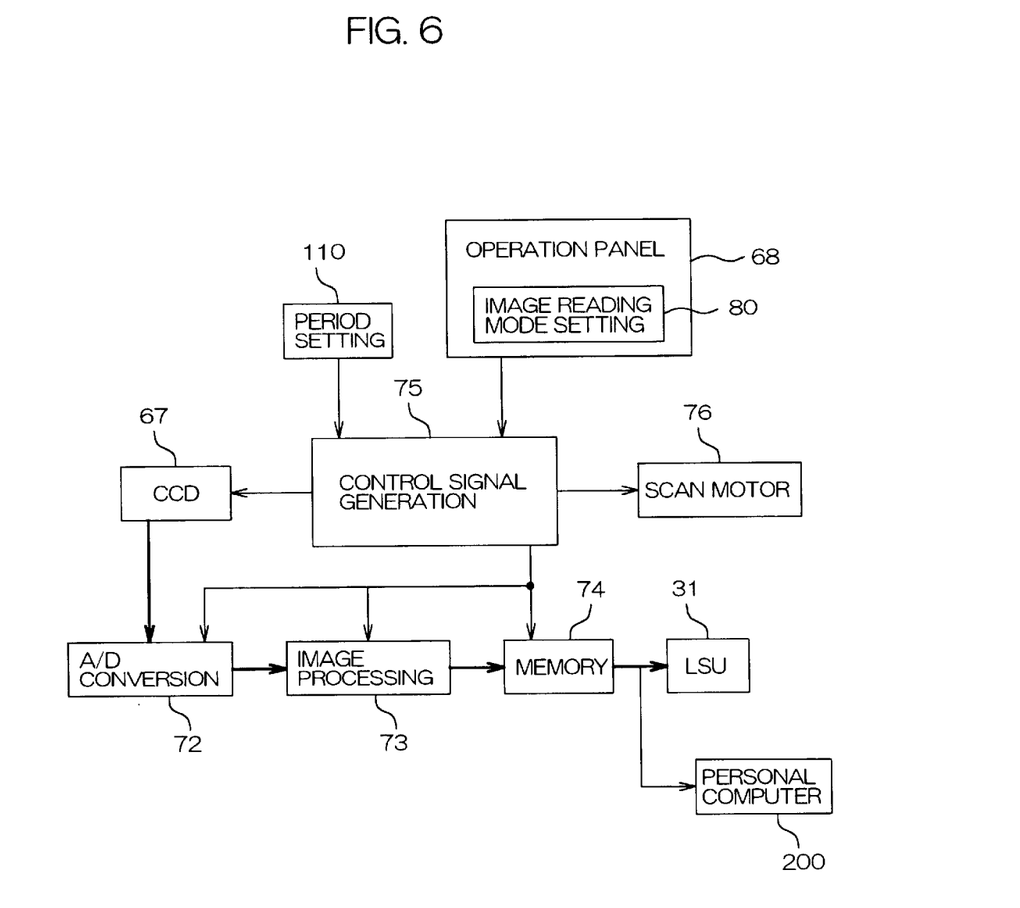
FIG. 6 is a block diagram showing the electrical configuration of the copying machine.

FIG. 5 is an illustration showing the configuration of the image reading device 21. FIG. 6 is a block diagram showing the electrical configuration of the image forming apparatus according to the present embodiment.

The image reading device 21 comprises, as main constituent elements, a CCD 67, a light source (for example, a halogen lamp) 69, and a control signal generation circuit 75. The light source 69, together with a mirror 63, is carried on a moving frame (not shown), to constitute a scanning unit 62. Mirrors 64 and 65 are carried on another moving frame (not shown), to constitute a mirror unit 71.

A document D to be read is stacked on a document platen 60 with its image surface directed downward. Below the document platen 60, the scanning unit 62 and the mirror unit 71 are moved along the sub-scanning direction rightward from the left in FIG. 5. Consequently, the image surface is illuminated and scanned by the light source 69, and light reflected from the document D is incident on a detection surface of the CCD 67 as reflected by the mirrors 63, 64, and 65 and going through a lens unit 66 in the course of the illumination and the scanning. Consequently, the reading of the image surface is achieved.

The scanning unit 62 and the mirror unit 71 are moved in the same direction. Letting V be the moving speed of the scanning unit 62, however, the moving speed of the mirror unit 71 is taken as V/2. Consequently, the optical path length during an image reading period, that is, the distance at which light emitted from the light source 69 is reflected on the image surface of the document D, is further reflected by the mirrors 63, 64, and 65, is transmitted by the lens unit 66, to lead to the CCD 67 is kept constant during the image reading period.

An image signal, which is an analog signal, outputted by the CCD 67 is converted into a digital signal by an A/D (analog-to-digital) conversion circuit 72, and the digital signal is then inputted to an image processing circuit 73, as shown in FIG. 6. The image processing circuit 73 subjects image data which is digital data to various types of image processing including black correction processing and shading correction processing. The image data after the image processing is temporarily stored in a memory 74 for an image editing function. The image data is read out at required timing from the memory 74, and is outputted to the exposure unit 31 in the image forming section 16 (see FIG. 1).

The image data is written into the memory 74 at a speed determined on the side of the image reading device 21, while being read out of the memory 74 at a speed determined on the side of the exposure unit 31. That is, the image data is temporarily stored in the memory 74, so that an image reading operation by the image reading device 21 and an image recording operation by the exposure unit 31 need not necessarily be synchronized with each other.

The CCD 67, the A/D conversion circuit 72, the image processing circuit 73, the memory 74, and a scan motor 76 for driving the scanning unit 62 and the mirror unit 71 are operated on the basis of control signals fed from the control signal generation circuit 75.

The CCD 67 is composed of a color CCD linear image sensor in the present embodiment. That is, the CCD 67 is a one-chip photoelectric conversion device in which three-line CCDs and a color filter are incorporated into one package. The CCD in each of the lines is constructed by lining up several thousands of light receiving elements with several microns square. A photodiode is used as the light receiving element, and one photodiode corresponds to one pixel. The photodiode generates, when light is incident thereon, charge corresponding to the amount of the light, and the generated charge is stored in a storage electrode of a photodiode. The stored charge is converted into a voltage signal. The voltage signal is outputted to the A/D conversion circuit 72 on the basis of a horizontal synchronizing signal inputted to the CCD 67 from the control signal generation circuit 75.

The period of the voltage signal outputted from the CCD 67 is determined depending on the period of the horizontal synchronizing signal. Resolution in the sub-scanning direction (sub-scanning line density) is determined depending on the determined period. In other words, the resolution in the sub-scanning direction is changed by changing the period of the horizontal synchronizing signal. Generally, the period of the horizontal synchronizing signal is controlled by the control signal generation circuit 75 such that the resolution in the sub-scanning direction is the same as resolution in the main scanning direction.

On the other hand, the change in the period of the horizontal synchronizing signal is merely the change in a time period during which charge is stored in the light receiving elements constituting the CCD 67. For example, if the luminous intensity of the light source 69 is constant, and if the period of the horizontal synchronizing signal is lengthened to increase the time period during which charge is stored, the amount of light incident on the light receiving element is increased, so that the output signal from the CCD 67 is made large. Accordingly, the S/N ratio of the image signal can be increased, thereby making it possible to improve the image quality of the toner image formed on the paper sheet P. If the time period during which charge is stored is set to an excessively long time period, however, the CCD 67 is bloomed.

The amount of light from the light source 69 and the sensitivity of the CCD 67 vary depending on their individuals. The period of the horizontal synchronizing signal is changed depending on the level of the output signal of the CCD 67, thereby making it possible to realize an image reading state which is most suitable for the CCD 67.

In the present embodiment, a document having a density used as the basis (for example, a standard white plate) is previously read, and a reference value of the period of the horizontal synchronizing signal is previously determined in correspondence with the output level of the CCD 67 at that time. The reference document is read at the time of shipment of the copying machine from a factory, and the obtained reference value is stored in a non-volatile manner in a predetermined memory. At the time of maintenance after the shipment from the factory, for example, the document having the density used as the basis is periodically read, the output level of the CCD 67 at that time and the reference value are compared with each other, and the period of the horizontal synchronizing signal is variably set on the basis of the compared values. Consequently, it is possible to compensate for the change in the amount of light from the light source 69 (for example, the decrease in the amount of light by degradation).

Specifically, at the time of maintenance, for example, the period of the horizontal synchronizing signal generated by the control signal generation circuit 75 is set to a long period when the amount of light emitted from the light source 69 is small, while being set to a short period when it is large, thereby making it possible to suitably set the time period during which charge is stored in the CCD 67. When the amount of light from the light source 69 is small, therefore, the time period during which charge is stored in the CCD 67 is increased, so that an output signal (a voltage signal) from the CCD 67 can be made large. Accordingly, the S/N ratio of the image signal can be increased, thereby making it possible to improve the image quality of the toner image. Even when a light source having no light amount adjusting function, a light source having a low amount of light, or a light source having an amount of emitted light decreased by long-term use is thus used, a good image quality for reading can be held.

On the other hand, when the horizontal synchronizing signal is changed, a time period required for reading on one line is changed. Accordingly, the scan motor 76 (see FIG. 5) for driving the scanning unit 62 and the mirror unit 71 must be controlled to simultaneously change the scanning speed of the document by the scanning unit 62 and the mirror unit 71. Specifically, when the period of the horizontal synchronizing signal is lengthened, the scan motor 76 is controlled in order to reduce the speed of the scanning unit 62 or the like to reduce the image reading speed (the scanning speed). Conversely, when the period of the horizontal synchronizing signal is shortened, the speed of the scanning unit 62 or the like is correspondingly increased to increase the scanning speed.

The period of the horizontal synchronizing signal may be set by a maintenance worker manually adjusting a period setting section 110 connected to the control signal generation circuit 75. For example, a predetermined input operation is performed from the operation panel 68, so that the CCD 67 reads the reference document, and an output level of the CCD 67 at that time and a reference value stored in a memory inside the copying machine are compared with each other by the function of a microcomputer inside the control signal generation circuit 75. The results of the comparison are displayed on a display portion of the operation panel 68 (a liquid crystal display portion, for example). The maintenance worker operates the period setting section 110 to set the period of the horizontal synchronizing signal to a suitable value on the basis of the displayed results of the comparison.

The control signal generation circuit 75 may be so constructed that the period of the horizontal synchronizing signal can be automatically variably set on the basis of the results of the comparison by the microcomputer. This allows maintenance work to be simplified.

In either case, if the control signal generation circuit 75 is so constructed that a driving signal corresponding to the period of the horizontal synchronizing signal is fed to the scan motor 76, the period of the horizontal synchronizing signal in the CCD 67 and the document scanning speed can coincide with each other.

On the other hand, in the image forming apparatus according to the present embodiment, a set signal in an image reading mode setting section 80 in the operation panel 68 provided in the copying machine main body 11 is fed to the control signal generation circuit 75.

The image reading mode setting section 80 can set as an image reading mode any one of a monochrome mode for reading a document image in a single color, a full color mode for reading a document image in a full color, and an image scanner mode for storing in the memory 74 image data obtained by image reading and not outputting the image data to a paper sheet. Image data representing an image read in the image scanner mode can be downloaded in information equipment such as a personal computer 200 through a suitable communication line from the memory 74.

The control signal generation circuit 75 variably sets the period of the horizontal synchronizing signal in response to the image reading mode set by the image reading mode setting section 80, and changes the driving signal to the scan motor 76 depending on the variable setting, to variably set the scanning speed for the document. More specifically, in the monochrome mode, the speed (the scanning speed) of the scan motor 76 is set to a relatively high speed, and the period of the horizontal synchronizing signal is shortened to set the time period during which charge is stored in the CCD 67 to a relatively short time period. On the other hand, in the full color mode or the image scanner mode, the speed of the scan motor 76 is set to a speed lower than the speed at the time of the monochrome mode, and the period of the horizontal synchronizing signal is set to a long period to set the time period during which charge is stored in the CCD 67 to a time period longer than that at the time of the monochrome mode.

In the full color mode or the image scanner mode, an image signal having a good S/N ratio can be thus obtained, as compared with that in the monochrome mode. Accordingly, it is possible to record an image of high quality on a paper sheet and to download image data representing the image of high quality in the information equipment such as the personal computer 200 from the memory 74.

More specifically, at the time of the full color mode and the image scanner mode, it is preferable that the period of the horizontal synchronizing signal is set to twice that at the time of the monochrome mode. Similarly, at the time of the full color mode and the image scanner mode, it is preferable that the speed of the scan motor 76 is set to one-half that at the time of the monochrome mode. For example, at the time of the full color mode and the image scanner mode, it is preferable that if the scanning speed (the moving speed of the scanning unit 62) is set to 67 mm/sec., the scanning speed is set to 134 mm/sec. at the time of the monochrome mode.

Figure 7:
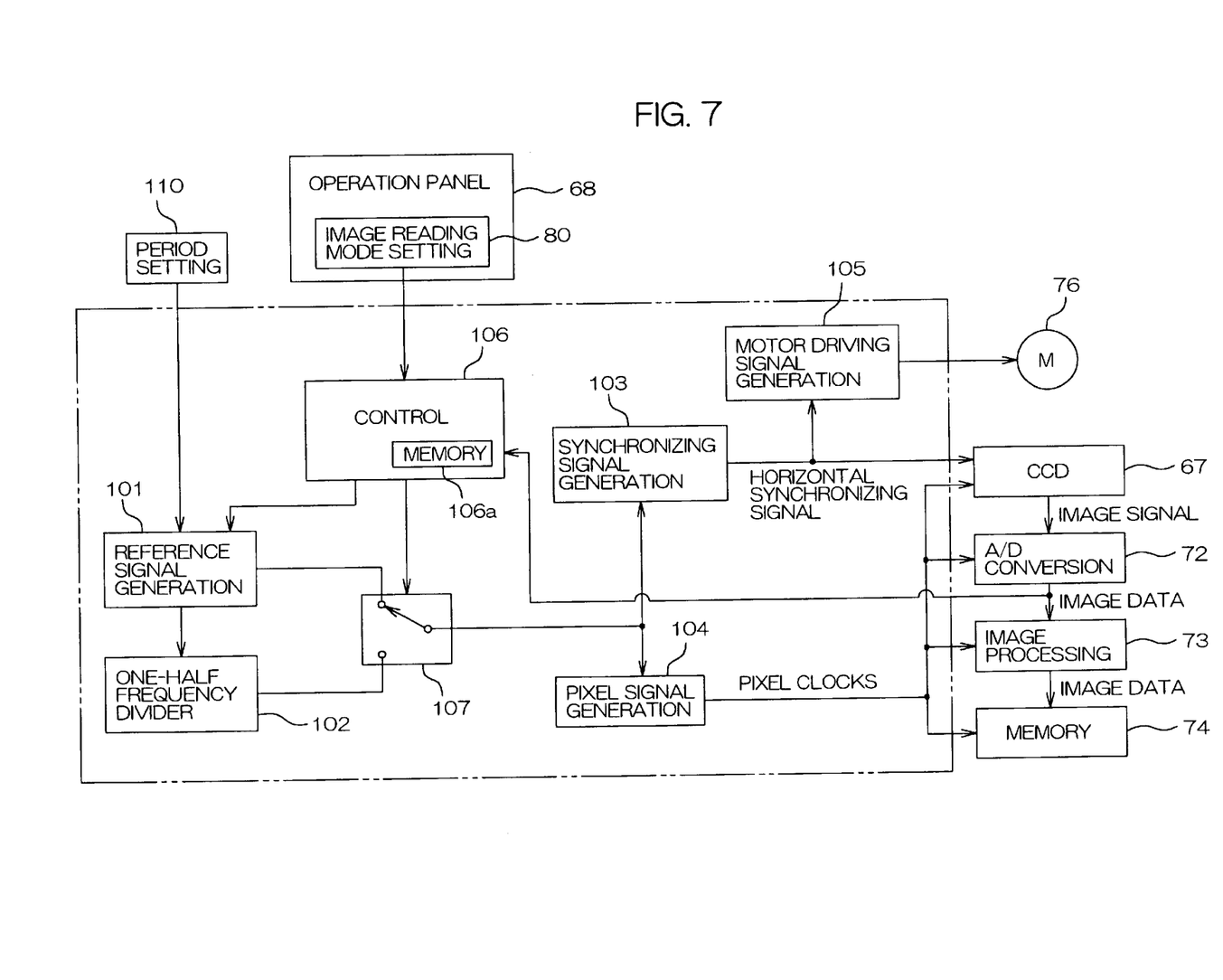
FIG. 7 is a block diagram for explaining the configuration of a control signal generation circuit in the copying machine.

FIG. 7 is a block diagram for explaining the configuration of the control signal generation circuit 75. The control signal generation circuit 75 comprises a horizontal synchronizing signal generation circuit 103 for feeding a horizontal synchronizing signal to the CCD 67, and a pixel signal generation circuit 104 for generating a pixel signal corresponding to each light receiving element in the CCD 67. The horizontal synchronizing signal generated by the horizontal synchronizing signal generation circuit 103 is also inputted to the CCD 67, and is also inputted to a motor driving signal generation circuit 105 for feeding a driving pulse signal to the scan motor 76.

On the other hand, pixel clocks generated by the pixel signal generation circuit 104 are inputted as a line transfer signal to the CCD 67, and are further inputted to the A/D conversion circuit 72, the image processing circuit 73, and the memory 74. Sampling in the A/D conversion circuit 72 is performed on the basis of the pixel clocks, data processing in the image processing circuit 73 is performed, and image data is written into the memory 74 at timing defined by the pixel clocks.

In order to generate the horizontal synchronizing signal and a reference frequency signal used as the basis of the pixel clocks, the control signal generation circuit 75 comprises a reference signal generation circuit 101. The reference frequency signal outputted by the reference signal generation circuit 101 is inputted to a one-half frequency divider circuit 102 and a switching circuit 107, respectively. The switching circuit 107 feeds the reference signal from the reference signal generation circuit 101 or a reference signal obtained by frequency-dividing the reference signal by half from the one-half frequency divider circuit 102, as a basic signal, to the horizontal synchronizing signal generation circuit 103 and the pixel signal generation circuit 104.

The switching circuit 107 receives a command signal from a control section 106 including a microcomputer or the like, and respectively connects the horizontal synchronizing signal generation circuit 103 and the pixel signal generation circuit 104 to the reference signal generation circuit 101 or the one-half frequency divider circuit 102.

The control section 106 controls the switching circuit 107 in response to the image reading mode set by the image reading mode setting section 80. That is, at the time of the monochrome mode, the control section 106 controls the switching circuit 107 in order to input as a basic signal the signal from the reference signal generation circuit 101 to the horizontal synchronizing signal generation circuit 103 and the pixel signal generation circuit 104. On the other hand, at the time of the full color mode and the image scanner mode, the switching circuit 107 is controlled such that the horizontal synchronizing signal generation circuit 103 and the pixel signal generation circuit 104 receive the basic signal from the one-half frequency divider circuit 102.

Consequently, at the time of the full color mode and the image scanner mode, a horizontal synchronizing signal having a period which is twice that at the time of the monochrome mode is generated from the horizontal synchronizing signal generation circuit 103. At the time of the full color mode and the image scanner mode, the pixel signal generation circuit 104 generates pixel clocks having a frequency which is one-half that at the time of the monochrome mode in response to the period of the horizontal synchronizing signal. Further, at the time of the full color mode and the image scanner mode, the motor driving signal generation circuit 105 drives the scan motor 76 at a speed which is one-half that at the time of the monochrome mode.

A period setting section 110 is connected to the reference signal generation circuit 101. By manually adjusting the period setting section 110, the frequency of the reference frequency signal generated by the reference signal generation circuit 101 can be variably set. Consequently, the period of the horizontal synchronizing signal and the speed of the scan motor 76 are changed depending on the amount of light emitted from the light source 69, thereby making it possible to perform a good image reading operation by the CCD 67.

The control section 106 is provided with a memory 106a composed of a non-volatile memory. The memory 106a stores the above-mentioned reference value relating to the amount of light emitted from the light source 69. A predetermined input operation for instructing the image reading section 21 to read a reference document is performed from the operation panel 68, so that the control section 106 compares the image data from the A/D conversion circuit 72 with the reference value in the memory 106a, to display the results of the comparison on a display portion of the operation panel 68. The period setting section 110 is operated on the basis of the contents of the display, thereby making it possible to set the frequency of the horizontal synchronizing signal to a suitable value. That is, the control section 106 functions as a comparison circuit for comparing the amount of light emitted from the light source 69 which is detected by the CCD 67 functioning as a light amount sensor with the reference value.

In order to make it possible to automatically adjust the reference frequency depending on the amount of light emitted from the light source 69, for example, the control section 106 may compare the image data from the A/D conversion circuit 72 with the reference value in the memory 106a, to input a control signal corresponding to the results of the comparison to the reference signal generation circuit 101 instead of providing the period setting section 110.

Although in the above-mentioned embodiment, description has been made of such construction that the image surface of the document D is fixedly read, the present invention is also applicable to such construction that an automatic document feeding mechanism (not shown) is utilized to read the document D while the document is conveyed.

Although in the above-mentioned embodiment, the period of the horizontal synchronizing signal and the scanning speed are switched by choosing whether or not the reference frequency signal is frequency-divided by half, a basic signal having a frequency different from the reference frequency may be generated by frequency-dividing the reference frequency signal by the reciprocal of an integer of not less than three (for example, ¼, ⅛ or the like).

Although the present invention has been described and illustrated in detail, it is clearly understood that the same is by way of illustration and example only and is not to be taken by way of limitation, the spirit and scope of the present invention being limited only by the terms of the appended claims.

The application corresponds to Japanese Patent Application Serial No. 2000-127010 filed with the Japanese Patent Office on Apr. 27, 2000 and Japanese Patent Application Serial No. 2000-321819 filed with the Japanese Patent Office on Oct. 20, 2000, the disclosures of which are incorporated herein by reference.

What is claimed is:

1. An image reading device comprising:
   an image sensor for scanning a surface of a document, optically reading an image formed on the surface of the document, and outputting an electric signal corresponding to the read image;
   a period control circuit for controlling the period of a horizontal synchronizing signal to be fed to the image sensor in order to change a time period during which charge is stored in the image sensor; and
   a scanning speed control circuit for controlling the scanning speed for the surface of the document by the image sensor to be a speed conforming to the period of the horizontal synchronizing signal.

2. The image reading device according to claim 1, further comprising
   an image reading mode setting section for setting an image reading mode,
   the period control circuit variably setting the period of the horizontal synchronizing signal depending on the image reading mode set by the image reading mode setting section,
   the scanning speed control circuit variably setting the scanning speed depending on the image reading mode set by the image reading mode setting section.

3. The image reading device according to claim 2, wherein
   the image reading mode which can be set by the image reading mode setting section includes a monochrome mode and a full color mode,
   the period control circuit sets the period of the horizontal synchronizing signal to a first period when the image reading mode is the monochrome mode, while setting the period of the horizontal synchronizing signal to a second period longer than the first period when the image reading mode is the full color mode, and
   the scanning speed control circuit sets the scanning speed to a first speed when the image reading mode is the monochrome mode, while setting the scanning speed to a second speed lower than the first speed when the image reading mode is the full color mode.

4. The image reading device according to claim 3, wherein
   the second period is an approximately integral multiple of the first period.

5. The image reading device according to claim 3, wherein
   the first speed is an approximately integral multiple of the second speed.

6. The image reading device according to claim 2, wherein
   the image reading mode which can be set by the image reading mode setting section includes a monochrome mode, a full color mode, and an image scanner mode,
   the period control circuit sets the period of the horizontal synchronizing signal such that the period at the time of the monochrome mode is shorter than the period at the time of the full color mode and the image scanner mode, and
   the scanning speed control circuit sets the scanning speed such that the speed at the time of the monochrome mode is faster than the speed at the time of the full color mode and the image scanner mode.

7. The image reading device according to claim 6, wherein
   the period control circuit sets the period of the horizontal synchronizing signal at the time of the full color mode and the image scanner mode to an approximately integral multiple of the period of the horizontal synchronizing signal at the time of the monochrome mode.

8. The image reading device according to claim 6, wherein
   the scanning speed control circuit sets the scanning speed at the time of the full color mode and the image scanner mode to an approximately integral fraction of the scanning speed at the time of the monochrome mode.

9. The image reading device according to claim 1, further comprising
   a light source for illuminating the surface of the document in order to read the document image by the image sensor,
   a light amount sensor for detecting the amount of light from the light source, and
   a light amount comparison circuit for comparing the amount of light detected by the light amount sensor with the reference amount of light.

10. The image reading device according to claim 9, further comprising
    an adjusting operation section for manually adjusting the setting of the period of the horizontal synchronizing signal by the period control circuit and the setting of the scanning speed by the scanning speed control circuit.

11. The image reading device according to claim 9, wherein
    the period control circuit variably sets the period of the horizontal synchronizing signal on the basis of the results of the comparison by the light amount comparison circuit, and
    the scanning speed control means variably sets the scanning speed on the basis of the results of the comparison by the light amount comparison circuit.

12. The image reading device according to claim 9, wherein
    the image sensor is also used as the light amount sensor.

13. An image forming apparatus comprising:
    an image sensor for scanning a surface of a document, optically reading an image formed on the surface of the document, and outputting an electric signal corresponding to the read image;
    a period control circuit for controlling the period of a horizontal synchronizing signal to be fed to the image sensor in order to change a time period during which charge is stored in the image sensor;
    a scanning speed control circuit for controlling the scanning speed for the surface of the document by the image sensor to be a speed conforming to the period of the horizontal synchronizing signal; and
    a print section for forming on a sheet an image corresponding to an output signal of the image sensor.

14. The image forming apparatus according to claim 13, further comprising
    an image reading mode setting section for setting an image reading mode,
    the period control circuit variably setting the period of the horizontal synchronizing signal depending on the image reading mode set by the image reading mode setting section, the scanning speed control circuit variably setting the scanning speed depending on the image reading mode set by the image reading mode setting section.

15. The image forming apparatus according to claim 13, further comprising a light source for illuminating the surface of the document in order to read the document image by the image sensor, a light amount sensor for detecting the amount of light from the light source, and a light amount comparison circuit for comparing the amount of light detected by the light amount sensor with the reference amount of light.

16. The image forming apparatus according to claim 15, further comprising an adjusting operation section for manually adjusting the setting of the period of the horizontal synchronizing signal by the period control circuit and the setting of the scanning speed by the scanning speed control circuit.

17. The image forming apparatus according to claim 15, wherein the period control circuit variably sets the period of the horizontal synchronizing signal on the basis of the results of the comparison by the light amount comparison circuit, and the scanning speed control means variably sets the scanning speed on the basis of the results of the comparison by the light amount comparison circuit.

18. The image forming apparatus according to claim 13, wherein the print section includes:

a photoreceptor, a charger for uniformly charging a surface of the photoreceptor, an exposure unit for forming an electrostatic latent image by selectively exposing the surface of the photoreceptor after the charging on the basis of an output signal of the image sensor, a developing unit for developing the electrostatic latent image into a toner image, and a transferrer for transferring the toner image on a sheet.

\* \* \* \* \*